US012779386B2

(12) United States Patent
Choi et al.

(10) Patent No.: US 12,779,386 B2
(45) Date of Patent: Nov. 3, 2026

(54) FILTER HOLDER, FILTER ASSEMBLY, AND AIR PURIFIER COMPRISING SAME

(71) Applicant: COWAY CO., LTD., Gongju-si (KR)

(72) Inventors: Yoon Hyuck Choi, Seoul (KR); Hyun Kyu Lee, Seoul (KR); Jong Cheol Kim, Seoul (KR); Seung Ki Kim, Seoul (KR); Sung Sil Kang, Seoul (KR); Ju Hyun Baek, Seoul (KR); Chan Jung Park, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 470 days.

(21) Appl. No.: 18/264,165

(22) PCT Filed: Jan. 28, 2022

(86) PCT No.: PCT/KR2022/001670

§ 371 (c)(1),
(2) Date: Aug. 3, 2023

(87) PCT Pub. No.: WO2022/169257

PCT Pub. Date: Aug. 11, 2022

(65) Prior Publication Data

US 2024/0123386 A1 Apr. 18, 2024

(30) Foreign Application Priority Data

Feb. 5, 2021 (KR) ........................ 10-2021-0017077

(51) Int. Cl.
*B01D 46/00* (2022.01)
*F24F 8/108* (2021.01)
(Continued)

(52) U.S. Cl.
CPC ..... *B01D 46/0016* (2013.01); *B01D 46/0005* (2013.01); *B01D 46/001* (2013.01);
(Continued)

(58) Field of Classification Search
None
See application file for complete search history.

(56) References Cited

U.S. PATENT DOCUMENTS 5,914,414 A 6/1999 Taomo et al.
10,821,389 B2 * 11/2020 Bae ........................ B01D 46/12
(Continued)

FOREIGN PATENT DOCUMENTS

CN 101259349 A 9/2008
CN 207641181 U 7/2018
(Continued)

OTHER PUBLICATIONS

EP 0423596 A1 Espacenet Machine Translation Obtained on Sep. 4, 2025 (Year: 2025).*
(Continued)

*Primary Examiner* — In Suk C Bullock
(74) *Attorney, Agent, or Firm* — Oblon, McClelland, Maier & Neustadt, L.L.P.

(57) ABSTRACT

A filter holder comprises: a plurality of filter frames disposed such that at least some thereof are adjacent to each other; and a folding member which supports filter frames, from among the plurality of filter frames, adjacent to each other so as to be rotatable with respect to each other. The folding member comprises: a folding part which has a predetermined thickness and is flexible so as to be foldable by means of rotation of the adjacent filter frames adjacent with respect to each other; and a plurality of edge parts which are connected to the respective sides of the folding part with the folding portion therebetween and rotate together with the adjacent filter frames, and wherein when viewed from a cross-section of the folding member, the edge parts may have a greater thickness than the folding part.

13 Claims, 8 Drawing Sheets

(51) Int. Cl.

| | |
|---|---|
| ***F24F 8/80*** | (2021.01) |
| ***F24F 13/28*** | (2006.01) |
| *B01D 29/00* | (2006.01) |
| *B01D 29/01* | (2006.01) |
| *B01D 29/50* | (2006.01) |
| *B01D 29/58* | (2006.01) |
| *B01D 46/10* | (2006.01) |
| *B01D 46/12* | (2022.01) |

(52) U.S. Cl.

CPC ..... *B01D 46/0013* (2013.01); *B01D 46/0056* (2013.01); *F24F 8/108* (2021.01); *F24F 8/80* (2021.01); *F24F 13/28* (2013.01); *B01D 29/0095* (2013.01); *B01D 29/01* (2013.01); *B01D 29/50* (2013.01); *B01D 29/58* (2013.01); *B01D 46/0002* (2013.01); *B01D 46/10* (2013.01); *B01D 46/12* (2013.01); *B01D 2271/02* (2013.01); *B01D 2273/14* (2013.01); *B01D 2273/30* (2013.01); *B01D 2275/205* (2013.01); *F24F 2221/36* (2013.01); *Y10S 55/31* (2013.01)

(56) References Cited

U.S. PATENT DOCUMENTS

| | | | |
|---|---|---|---|
| 2006/0124642 | A1 | 6/2006 | Karow et al. |
| 2018/0304184 | A1 | 10/2018 | Gunnefur |

FOREIGN PATENT DOCUMENTS

| | | | | |
|---|---|---|---|---|
| EP | 0423596 | A1 * | 4/1991 | .......... A47B 96/202 |
| EP | 3 744 414 | A1 | 12/2020 | |
| JP | 62-52670 | U | 4/1987 | |
| JP | 64-31926 | U | 2/1989 | |
| JP | 2003-24729 | A | 1/2003 | |
| JP | 2008-253886 | A | 10/2008 | |
| KR | 10-2013-0079780 | A | 7/2013 | |
| KR | 10-2017-0046325 | A | 5/2017 | |

OTHER PUBLICATIONS

International Search Report mailed on May 9, 2022 in PCT/KR2022/001670 filed on Jan. 28, 2022, 3 pages.

Office Action issued Jul. 16, 2024, in corresponding Japanese Patent Application No. 2023-545381 (with English Translation), citing documents 15-17 therein, 8 pages.

Combined Chinese Office Action and Search Report issued Oct. 25, 2025, in corresponding Chinese Patent Application No. 202280013610.8 (with English Translation of Category of Cited Documents), 9 pages.

European Communication pursuant to Article 94(3) EPC issued Nov. 18, 2025, in corresponding European Patent Application No. 22750006.3, 4 pages.

* cited by examiner

B

C

FILTER HOLDER, FILTER ASSEMBLY, AND AIR PURIFIER COMPRISING SAME

TECHNICAL FIELD

The present disclosure relates to a filter holder, a filter assembly, and an air purifier including the same.

BACKGROUND ART

In general, an air purifier is a device for sucking polluted indoor air, and filtering out dust, odor particles, and the like contained in the air through a filter to purify the air into clean air. Such an air purifier can purify indoor air by sucking in and purifying the surrounding polluted air, and then discharging the purified clean air to the outside of the air purifier.

Meanwhile, the air purifier may include an air filter for filtering out dust, odor particles, and the like contained in the air introduced into the air purifier, and a filter holder supporting the air filter. Such a filter holders may have various shapes depending on the type of air purifier. For example, the filter holder may be provided in a cylindrical shape, a rectangular parallelepiped shape, or the like.

However, the filter holder having the shape described above occupies a relatively large volume in the process of transporting, and thus, a lot of cost is incurred in transporting the filter holder. Accordingly, a foldable filter holder is being developed to reduce the volume when transporting the filter.

US Patent Application Publication No. 2018/0221805 "Air Purifier" (Patent Document 1) of the present applicant discloses a shape variable filter frame. The filter frame of Patent Document 1 can be folded or unfolded as needed.

However, since the filter frame of Patent Document 1 is provided with a complicated hinge structure for folding the filter frame, the manufacturing cost increases and it is inconvenient to mount the filter frame to the air purifier. In addition, when the filter frame is arbitrarily unfolded in a folded state, it is difficult to transport the filter frame, and when the filter frame is arbitrarily folded while the air purifier is in use, the efficiency of the air purifier may be reduced.

In addition, US Patent Application Publication No. 2018/0304184 "Foldable Air Filter Unit" (Patent Document 2) of Blueair AB, the applicant, also discloses a foldable filter frame that can be folded or unfolded as needed.

However, in the filter frame of Patent Document 2, it is difficult to maintain the unfolded or folded state without a special device. In particular, when the filter frame of Patent Document 2 is arbitrarily unfolded in a folded state, it is difficult to transport the filter frame, and when the filter frame is arbitrarily folded while the air purifier is in use, the efficiency of the air purifier may decrease. In addition, even if a means for preventing the filter frame from being arbitrarily folded or unfolded is separately provided, when the means for preventing free rotation of the filter frame has a complicated configuration, the manufacturing cost increases and it is inconvenient to mount the filter frame to the air purifier.

Accordingly, there is a need for a filter frame with a simple structure capable of preventing the filter frame from being arbitrarily folded or unfolded while reducing the manufacturing cost of the filter frame.

PRIOR ART DOCUMENT (Patent Document 1) US Patent Application Publication 2018/0221805 (published on Aug. 9, 2018)

(Patent Document 2) US Patent Application Publication 2018/0304184 (published on Oct. 25, 2018)

DETAILED DESCRIPTION OF INVENTION

Technical Problems

In view of the above, one embodiment of the present disclosure provide a filter holder in which a folding member is capable of being easily mounted on a filter frame while the folding member rotatably connects adjacent filter frames.

Further, one embodiment of the present invention provides a filter holder in which when a folding member is mounted on a filter frame, the folding member is not separated from the filter frame even when the filter frame is rotated a plurality of times.

Technical Solution

In accordance with one aspect of the present disclosure, there is provided a filter holder comprising: a plurality of filter frames, at least some of which are disposed adjacent to each other; and a folding member rotatably supporting the adjacent filter frames among the plurality of filter frames, wherein the folding member includes: a folding portion having a predetermined thickness and having flexibility to allow the folding portion to be folded by rotation of the adjacent filter frames with respect to each other; and a plurality of edge portions connected to both sides of the folded portion with the folding portion therebetween and rotating together with the adjacent filter frames, and wherein the edge portions have a thickness greater than that of the folding portion when viewed in a cross-section of the folding member.

Further, the edge portion may have a shape in which the thickness of the edge portion becomes thicker as a distance from the folding portion increases.

Further, the folding member may extend along a longitudinal direction of the filter frames to seal a gap between the adjacent filter frames, and may extend in a width direction of the filter frame to engage with the filter frame.

Further, the plurality of filter frames may be arranged along a loop-shaped path when the plurality of filter frames are rotated relative to each other such that each of the plurality of filter frames forms an angle smaller than a flat angle with respect to the filter frame adjacent thereto, and the folding member may further include a plurality of hooking portions engaged with the respective adjacent filter frames and connected to the respective edge portions, and each of the plurality of filter frames may be provided with an engaging portion depressed from an inner side of the loop-shaped path toward an outer side thereof to engage with the hooking portion.

Further, each of the plurality of filter frames may be provided with a fixing portion extending in a direction different from a direction in which the engaging portion extends and having one side communicating with the engaging portion, and each of the hooking portions may include: a main hook engaged with the engaging portion; and an auxiliary hook protruding from the main hook and engaged with the fixing portion.

Further, the main hook is inserted in a width direction of the filter frame and engaged with the engaging portion, and the auxiliary hook may include: a stepped surface extending in a direction perpendicular to a direction in which the main hook extends; and an inclined surface inclined toward a direction in which the main hook is inserted into the engaging portion.

Further, the folding member may extend along a longitudinal direction of the filter frames, wherein the fixing portion and the auxiliary hook are each provided in plurality, the plurality of fixing portions may be spaced apart from each other along the longitudinal direction in the filter frames, and the plurality of auxiliary hooks may be spaced apart from each other along the longitudinal direction corresponding to each of the plurality of fixing portion in the hooking portion.

In accordance with another aspect of the present disclosure, there is provided a filter assembly comprising: the filter holder described above; and an air filter, for filtering air, supported by the filter holder.

In accordance with still another aspect of the present disclosure, there is an air purifier comprising: the filter assembly described above; and a blower for providing blowing force to cause outside air to flow through the air filter.

Effect of Invention

According to one embodiment of the present disclosure, the folding member can be easily mounted on the filter frame while the folding member rotatably connects adjacent filter frames.

Further, according to one embodiment of the present disclosure, when the folding member is mounted on the filter frame, the folding member is not separated from the filter frame even when the filter frame is rotated a plurality of times.

BEST MODE FOR CARRYING OUT THE INVENTION

Hereinafter, a specific embodiment of the present disclosure for implementing the idea of the present disclosure will be described in more detail with reference to the accompanying drawings.

Further, in describing the present disclosure, when it is determined that detailed descriptions of known configurations or functions may obscure the gist of the present disclosure, the detailed descriptions thereof will be omitted.

In addition, when an element is referred to as being 'connected' to, 'supported' by, or 'flowed' into another element, it should be understood that the element may be directly connected to, supported by, or flowed into the other element, but that other elements may exist between the elements.

The terms used in the present disclosure are only used for describing the specific embodiment, and are not intended to limit the present disclosure. Singular expressions include plural expressions unless the context clearly indicates otherwise.

The meaning of "including" used in the present specification specifies specific features, regions, integers, steps, operations, elements and/or components, and does not exclude the presence or addition of other specific features, regions, integers, steps, operations, elements, components, and/or groups.

In addition, in the present specification, expressions related to directions such as upper side, etc. are described based on the drawings, and it is declared in advance that they may be expressed differently if the direction of the object is changed.

Hereinafter, a specific configuration of an air purifier 1 according to one embodiment of the present disclosure will be described with reference to the drawings.

Figure 1:
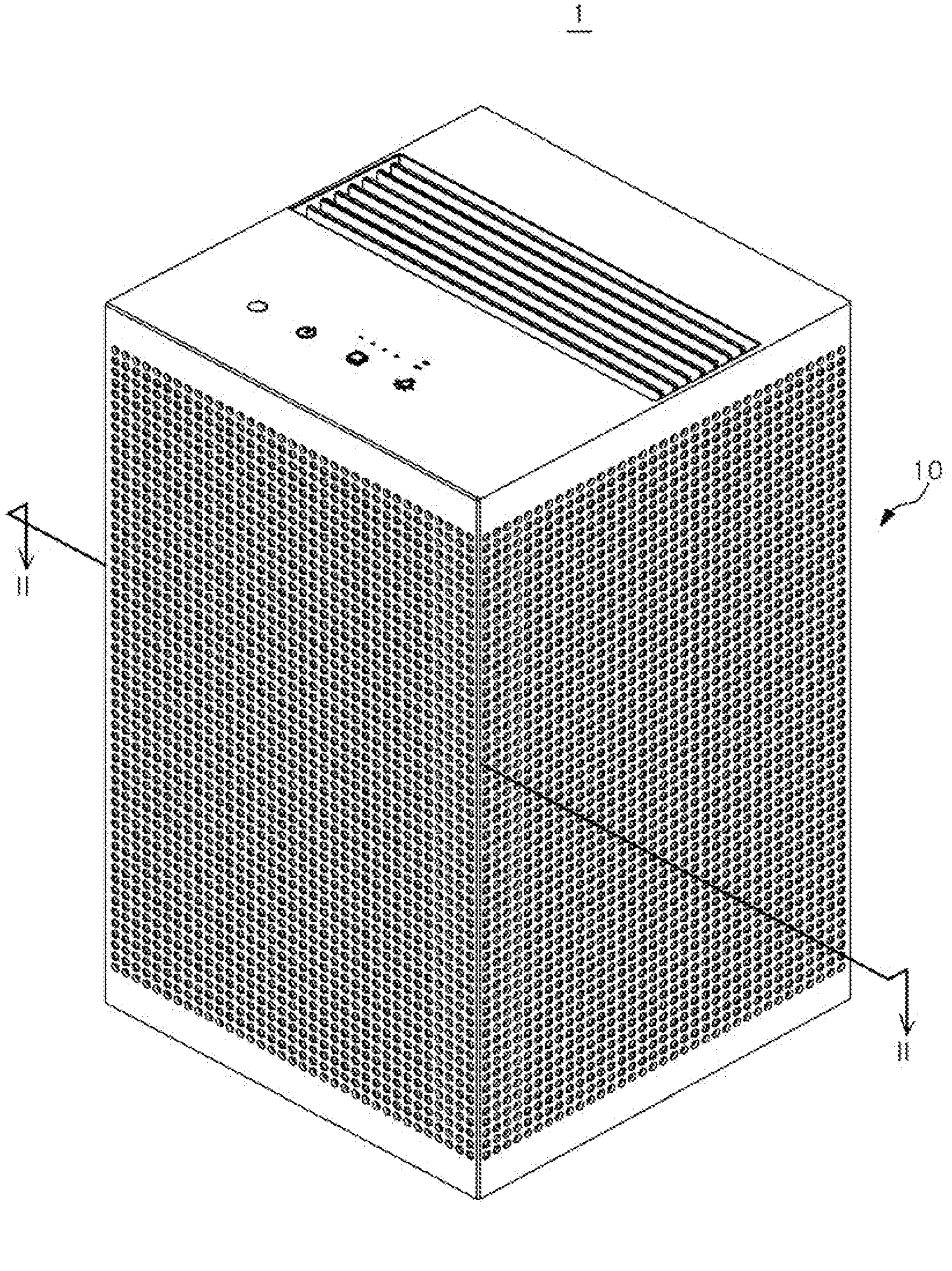
FIG. 1 is a perspective view showing an air purifier according to one embodiment of the present invention.
Figure 2:
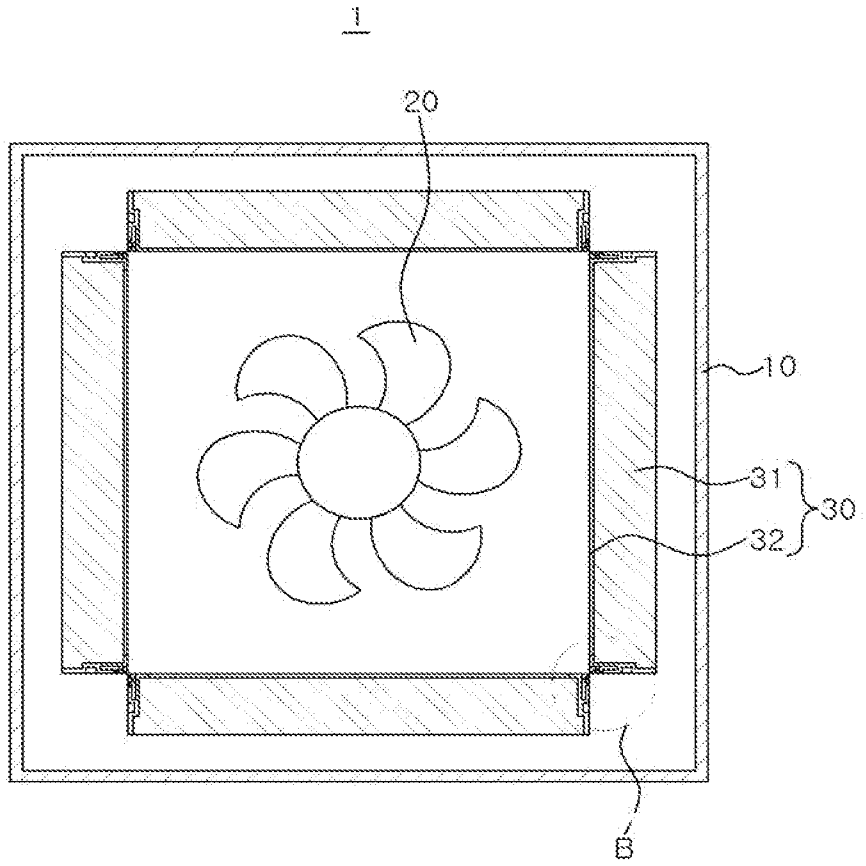
FIG. 2 is a cross-sectional view taken along line II-II of FIG. 1.

Referring to FIGS. 1 and 2, the air purifier 1 according to one embodiment of the present disclosure can purify polluted air into clean air by filtering out dust, odor particles, and the like in the air introduced into the air purifier 1. In addition, the air purifier 1 can suck outside air into the air purifier and discharge clean air purified therein to the outside. The air purifier 1 may include a body 10, a blower 20, and a filter assembly 30.

The body 10 may support the blower 20 and the filter assembly 30, and may provide a space in which the blower 20 and the filter assembly 30 are accommodated. The body 10 may include a case surrounding the blower 20 and the filter assembly 30.

The blower 20 may be driven to allow polluted air outside the air purifier 1 to be introduced into the air purifier 1. The blower 20 may provide blowing force to cause the introduced air to flow through an air filter 31 to be described later. In addition, the blower 20 may be driven to discharge air purified by the filter assembly 30 in the air purifier 1 to the outside. For example, the blower 20 may be disposed at lower side in the body 10 and may be disposed on an inner side of the air filter 31.

The filter assembly 30 can filter air introduced from the outside of the air purifier 1 into clean air. Further, the filter assembly 30 may be configured to be folded or unfolded as needed. For example, the filter assembly 30 may be transported in a folded state during transport, and may be used in an unfolded state when used for air filtration. The filter assembly 30 may include an air filter 31 and a filter holder 32.

The air filter 31 can filter air introduced from the outside of the air purifier 1 into clean air. For example, the air filter 31 can filter out dust and odor particles in the air, and may include well-known filters such as a mesh structure pre-filter, a HEPA filter, and an activated carbon deodorizing filter (carbon filter). The air filter 31 may include a plurality of air filters, and the plurality of air filters 31 may be supported by the filter holder 32.

Figure 3:
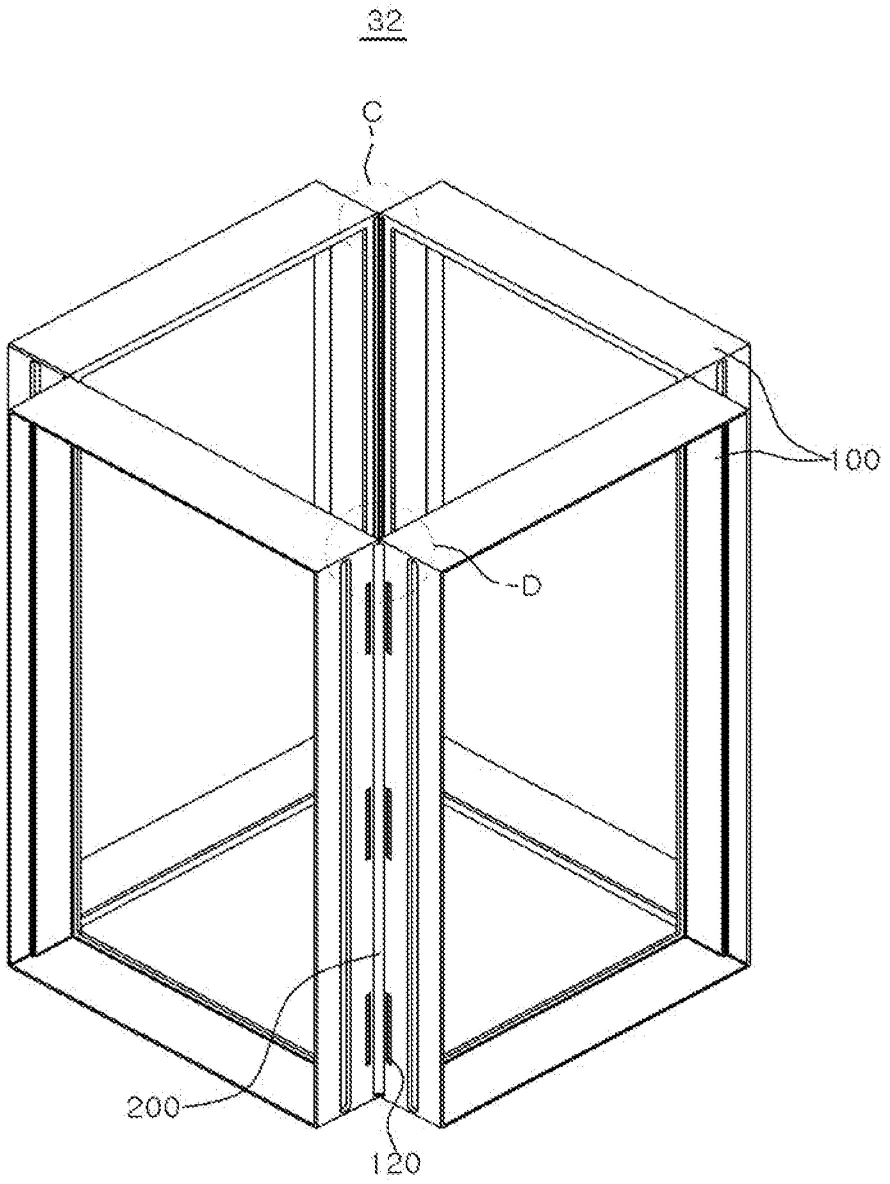
FIG. 3 is a perspective view of a filter holder of FIG. 2 when it is placed in an unfolded state.
Figure 4:
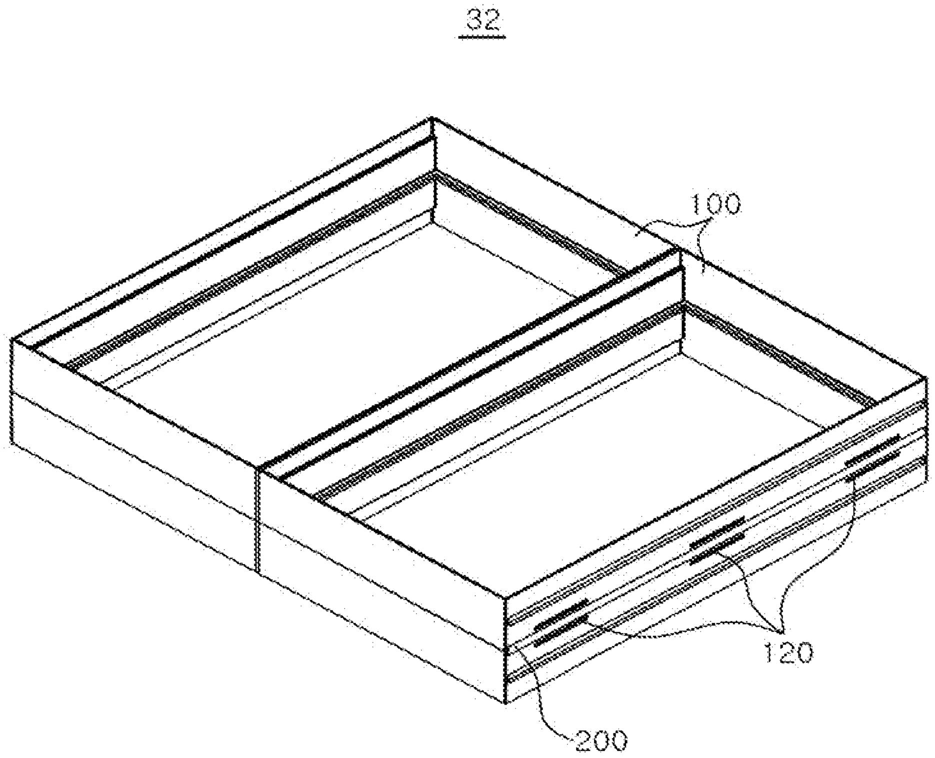
FIG. 4 is a perspective view of the filter holder of FIG. 3 when it is placed in a folded state.
Figure 5:
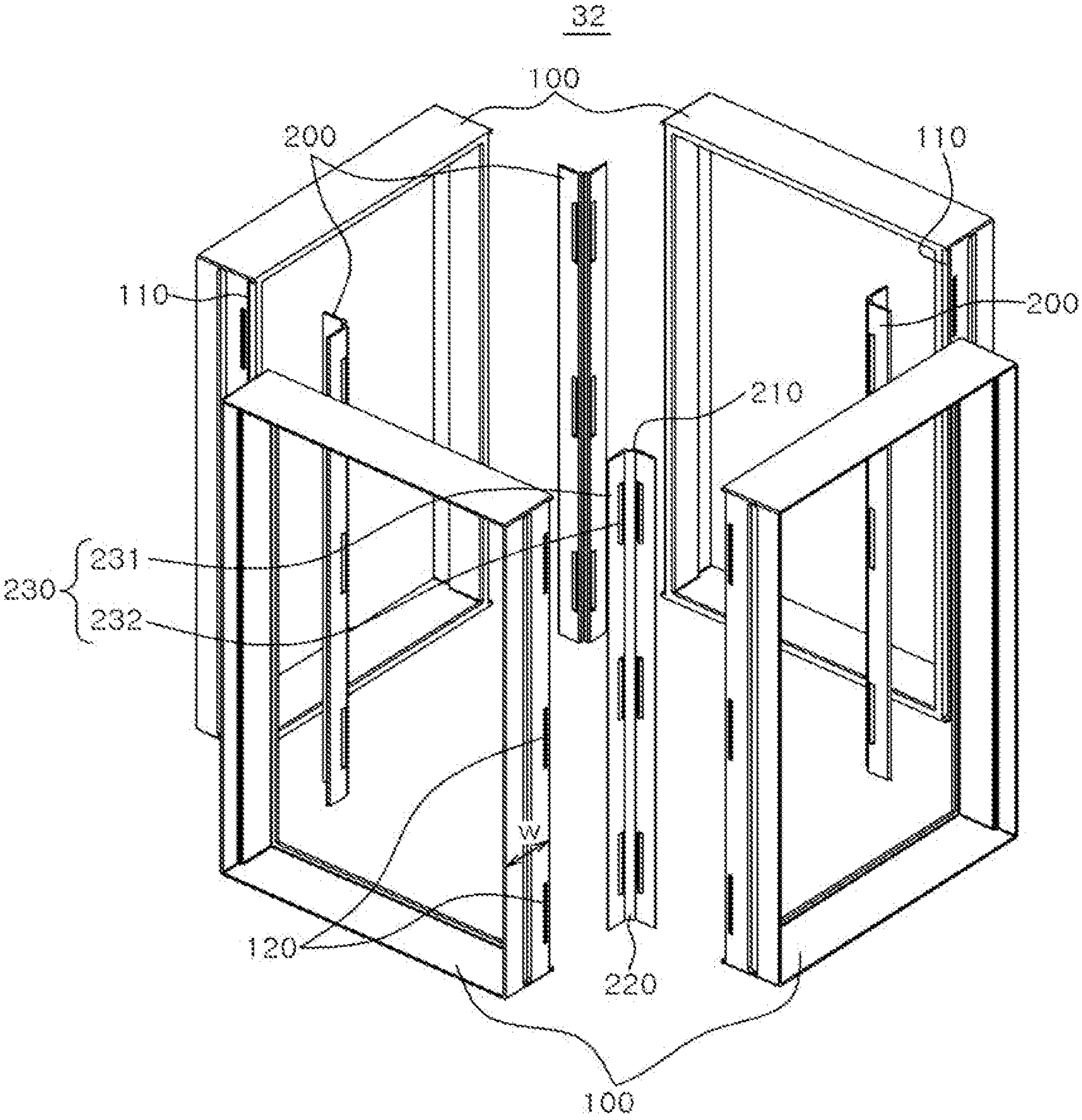
FIG. 5 is an exploded perspective view of FIG. 3.

Referring to FIGS. 3 to 5, the filter holder 32 may be configured to be folded or unfolded. The filter holder 32 may include a filter frame 100 and a folding member 200. Further, the filter frame 100 and the folding member 200 may be slid to be connected to and separated from each other. That is, the filter frame 100 and the folding member 200 may be detachably connected to each other.

The filter frame 100 may be provided to surround at least a portion of the air filter 31 and may support the air filter 31. In addition, at least a portion of the filter frame 1M may extend in a longitudinal direction and a width direction of the filter frame 100. The filter frame 100 may include a plurality of filter frames 100, at least some of the plurality of filter frames 100 may be disposed adjacent to each other. In addition, the plurality of filter frames 100 may include two or more filter frames 100, and as a more specific example, an even number of filter frames 100 may be provided. Hereinafter, it is described that four filter frames 100 are provided, but this is only an example, and any number of the filter frames 100 may be provided.

Each of the plurality of filter frames 100 may be connected to other filter frames 100 disposed adjacent to both sides thereof through the folding member 200. In addition, the plurality of filter frames 100 may be configured to be rotatable with respect to each other. That is, any one of the plurality of filter frames 100 may rotate with respect to another filter frame 100 adjacent thereto. Further, each of the plurality of filter frames 100 may be folded or unfolded with respect to the filter frame 100 adjacent thereto by rotating about an imaginary axis extending in the longitudinal direction.

When the plurality of filter frames 100 are rotated relative to each other such that each of the plurality of filter frames 100 forms an angle smaller than the flat angle with respect to the filter frame 100 adjacent thereto, the plurality of filter frames 100 may be arranged along a loop-shaped path. In this case, the loop-shaped path may be defined as a predetermined path that starts from one point, passes through another point, and then returns to the one point.

As a more specific example, referring to FIG. 3, each of the plurality of filter frames 100 may be rotated with respect to the filter frame 100 adjacent thereto so as to form a predetermined angle (e.g., 90°) with the adjacent filter frame 100. In this case, the predetermined angle may be an angle at which an area of an inner space surrounded by the filter frames 100 is maximized when viewed from above. In this case, the plurality of filter frames 100 viewed from above may form a rectangular loop. In the present specification, when each of the plurality of filter frames 100 forms an angle greater than 0° and smaller than 180° with respect to the adjacent filter frame 100, the state of the plurality of filter frames 100 is defined as an unfolded state.

Referring to FIG. 4, the plurality of filter frames 100 may rotate relative to each other so that at least two filter frames 100 adjacent to each other are arranged in parallel. As a more specific example, any one of the plurality of filter frames 100 may be folded with respect to another filter frame 100 connected to one side thereof by rotating with respect to the another filter frame 100. In this case, the angle between one filter frame 100 and another filter frame 100 connected to one side thereof is 0°. In addition, the one filter frame 100 may be unfolded with respect to still another filter frame 100 connected to the other side thereof by rotating with respect to the still another filter frame 100. In this case, the angle between one filter frame 100 and still another filter frame 100 connected to the other side thereof is 180°. In the present specification, when the angle between each of the plurality of filter frames 100 and the adjacent filter frame 100 is 0° or 180°, the state of the plurality of filter frames 100 is defined as a folded state.

As such, when the plurality of filter frames 100 are in the folded state, two filter frames 100 adjacent to each other are arranged in parallel, so that the adjacent filter frames 100 may come into close contact with each other. In addition, since the space surrounded by the plurality of filter frames 100 is minimized, the volume of the plurality of filter frames 100 can be minimized.

Meanwhile, referring to FIGS. 3 to 6, each of the plurality of filter frames 100 may be provided with an engaging portion 110 and a fixing portion 120.

The engaging portion 110 may be depressed from a surface of the filter frame 100 so that a main hook 231 of the folding member 200 to be described later can be engaged therewith. When the plurality of filter frames 100 are placed in the unfolded state, the engaging portion 110 may be depressed from the inside to the outside of the loop-shaped path. In other words, for example, the engaging portion 110 may be depressed from the filter frame 100 in a width direction of the folding member 200. In addition, the engaging portion 110 may extend along a longitudinal direction corresponding to the folding member 200 extending in the longitudinal direction. In this case, the width direction of the folding member 200 means a direction extending from an inner edge of one filter frame 100 to an outer edge of the corresponding filter frame 100. In other words, the shape of the inner edge of the filter frame 100 and the shape of the outer edge of the filter frame 100 may be a shape corresponding to the air filter 31, and may be a rectangular shape having a longer longitudinal length. In a width W of the folding member 200 shown in FIG. 5, a direction away from a direction close to the folding portion 220 may be the width direction of the folding member 200. The engaging portion 110 may include a plurality of engaging portions, and may be formed on both sides of the filter frame 100 in the width direction. In other words, the engaging portion 110 of the filter frame 100 may be formed to be included in a longitudinal section of a loop formed when the plurality of the filter frames 100 is placed in the unfolded state.

The fixing portion 120 may be depressed from a surface of the filter frame 100 so that an auxiliary hook 232 can be inserted. The fixing portion 120 may extend in a direction different from the direction in which the engaging portion 110 extends. For example, the fixing portion 120 may extend along the width direction such that one side communicates with the engaging portion 110 and the other side opens toward the outside of the filter frame 100. In addition, the fixing portion 120 may include a plurality of fixing portions 120, and the plurality of fixing portions 120 may be spaced apart along the longitudinal direction.

Figure 6:
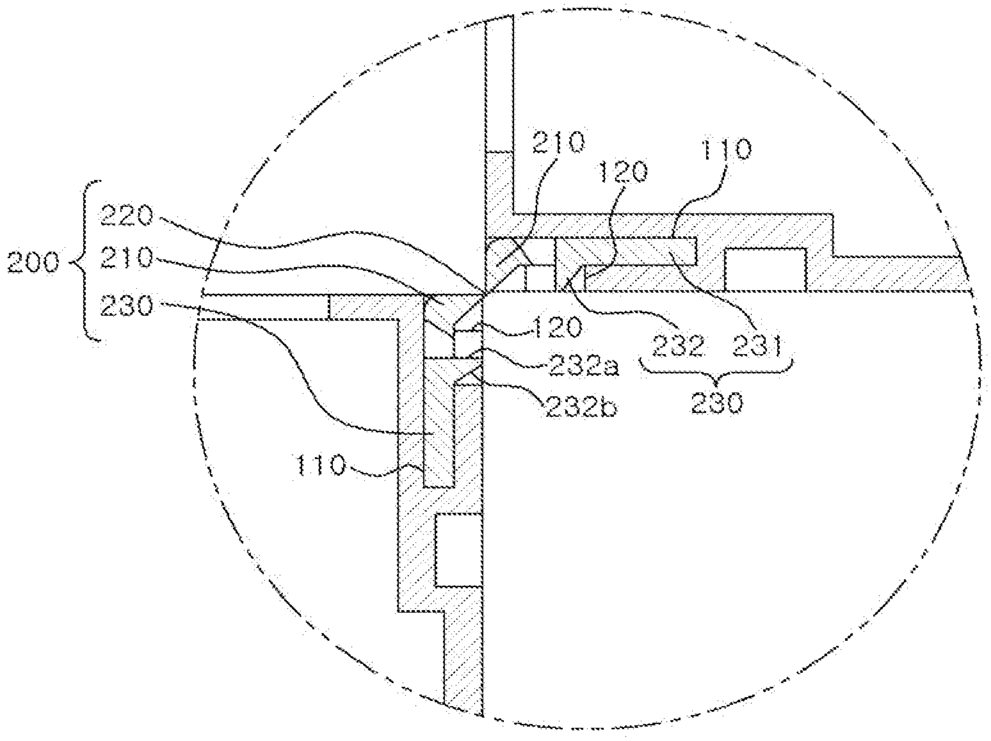
FIG. 6 is an enlarged view of part B in FIG. 2.
Figure 7:
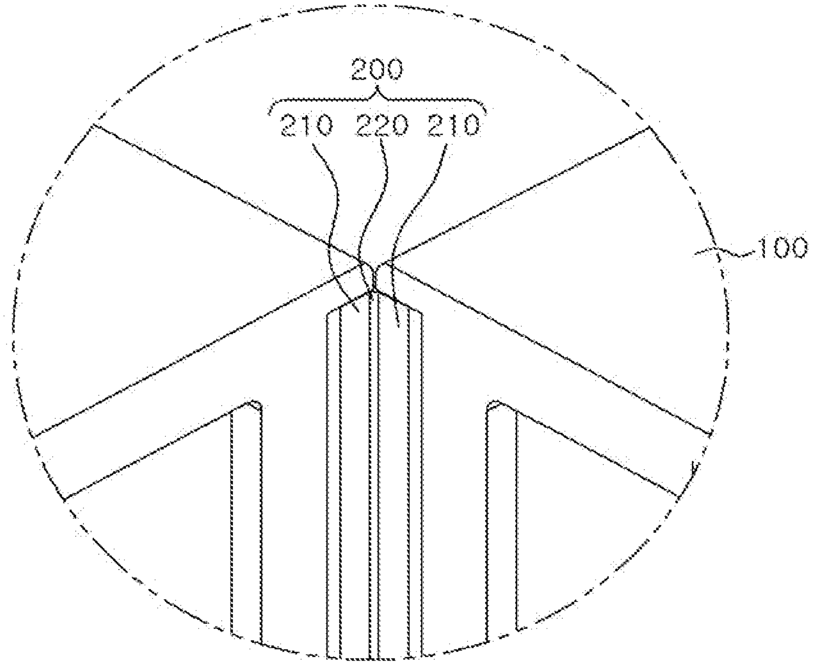
FIG. 7 is an enlarged view of part C in FIG. 3.
Figure 8:
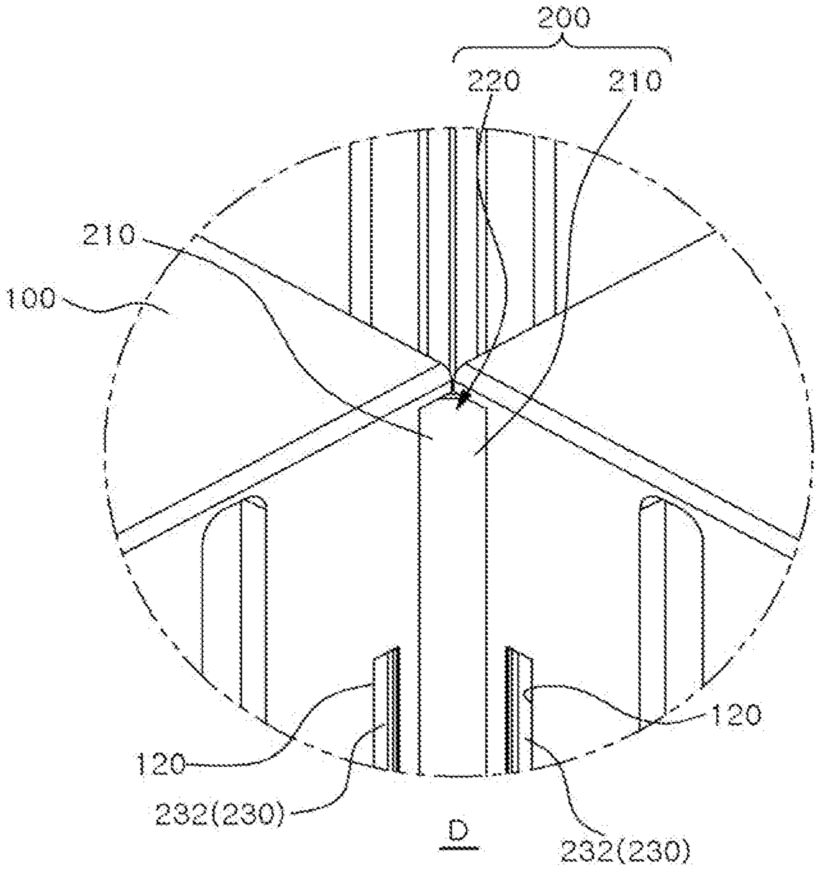
FIG. 8 is an enlarged view of part D in FIG. 3.

Referring to FIGS. 6 to 8, the folding member 200 may rotatably support adjacent some of the plurality of filter frames 100 relative to each other. For example, the folding member 200 may connect two adjacent filter frames 100 by having one side engaged with one of the adjacent filter frames 100 and the other side engaged with the other one of the adjacent filter frames 100. The folding member 200 may extend in the width direction of the filter frame 100 to be engaged with the filter frame 100. Further, the folding member 200 may extend along the longitudinal direction of the filter frame 100 to seal a gap between adjacent filter frames 100. That is, when the plurality of filter frames 100 are placed in the unfolded state while the folding member 200 is engaged with the filter frames 100, the gap between the plurality of filter frames 100 can be sealed by the folding member 200.

The folding member 200 may have flexibility so that the folding member 200 can be easily bent by an external force to be easily engaged with the filter frame 100. In addition, when the plurality of filter frames 100 are arranged along a loop-shaped path, the folding member 200 may be inserted into the filter frame 100 from the inside of the loop-shaped path toward the outside. The folding member 200 may include an edge portion 210, a folding portion 220 and a hooking portion 230.

One side of the edge portion 210 may be connected to the folding portion 220 and the other side may be connected to the hooking portion 230. The edge portion 210 may include a plurality of edge portions 210, and the plurality of edge portions 210 may be connected to both sides of the folding portion 220 with the folding portion 220 interposed therebetween. In addition, the plurality of edge portions 210 may be connected to a plurality of hooking portions 230 provided to the filter frames 100 adjacent to each other, and rotate together with the adjacent filter frames 100 through the plurality of locking parts 230. Meanwhile, the edge portion 210 may have a predetermined thickness. For example, the edge portion 210 may have a thickness greater than that of the folding portion 220 when viewed from above (including when a cross-section thereof is viewed from above). Further, the edge portion 210 may have a shape in which the thickness thereof increases as the distance from the folding portion 220 increases when viewed from above. In other words, one side of the edge portion 210 connected to the folding portion 220 may have a thinner thickness than the other side connected to the locking part 230.

The folding portion 220 may be selectively folded by rotation of the adjacent filter frames 100 relative to each other. That is, the folding portion 220 may be a portion of the folding member 200 that is folded by rotation of the filter frame 100. For example, the folding portion 220 may extend in the longitudinal direction and may correspond to a virtual rotation axis about which the adjacent filter frames 100 rotate relative to each other. In addition, the folding portion 220 may have flexibility so as to be folded by rotation of the filter frames 100 adjacent to each other. Both sides of the folding portion 220 may be connected to the plurality of edge portions 210, respectively.

Referring to FIG. 6 again, the hooking portion 230 may be engaged with the filter frame 100 to connect the adjacent filter frames 100 to each other. The hooking portion 230 may include a plurality of the hooking portions, and each of the plurality of hooking portions 230 may be inserted into the adjacent filter frames 100. For example, the hooking portion 230 may be inserted into the filter frame 100 along the width direction of the filter frame 100. In other words, the hooking portion 230 may be inserted along a surface of the filter frame 100 in a direction away from the folding portion 220. In addition, each of the plurality of hooking portions 230 may be connected to the edge portion 210. The locking part 230 may include a main hook 231 and an auxiliary hook 232.

The main hook 231 may extend in the width direction of the filter frame 100 and may be inserted into the engaging portion 110. The main hook 231 may rotate together with the filter frame 100 while being inserted into the engaging portion 110.

The auxiliary hook 232 may prevent the main hook 231 inserted into the engaging portion 110 from being separated from the engaging portion 110. For example, the auxiliary hook 232 may be a protrusion protruding from the main hook 231, and the auxiliary hook 232 may be formed in a direction perpendicular to the direction in which the main hook 231 extends. In addition, the auxiliary hook 232 may be engaged with the fixing portion 120. The auxiliary hook 232 may include a plurality of auxiliary hooks, and the plurality of auxiliary hooks 232 may be spaced apart along the longitudinal direction. In addition, each of the plurality of auxiliary hooks 232 may correspond to and be engaged with the plurality of fixing portions 120. The auxiliary hook 232 may include a stepped surface 232*a* and an inclined surface 232*b*.

The stepped surface 232*a* can prevent the folding member 200 from being separated from the filter frame 100 by interfering with the filter frame 100 when the auxiliary hook 232 is inserted into the fixing portion 120. The stepped surface 232*a* may extend in the auxiliary locking member 232 in a direction perpendicular to the direction in which the main hook 231 extends. That is, it may extend in the width direction of the filter frame 100. For example, when the main hook 231 moves in a direction away from the engaging portion 110 while the auxiliary hook 232 is inserted into the fixing portion 120, the stepped surface 232*a* can be caught by the filter frame 100. Due to this, the folding member 200 can be prevented from being separated from the filter frame 100.

The inclined surface 232*b* may have a predetermined slope so that when the main hook 231 is inserted into the engaging portion 110, the auxiliary hook 232 is inserted into the engaging portion 110 without interfering with the filter frame 100. The inclined surface 232*b* may be inclined toward the direction in which the main hook 231 is inserted into the engaging portion 110.

As such, the folding member 200 can be easily inserted into the engaging portion 110 by the inclined surface 232*b*. In addition, since the folding member 200 has flexibility, the hooking portion 230 can be deformed in shape, and accordingly, when the folding member 200 is inserted into the filter frame 100, the hooking portion 230 can be inserted without interfering with the filter frame 100. Due to this, the folding member 200 can be easily mounted on the filter frame 100.

In addition, when the folding member 200 is inserted into the engaging portion 110 and the fixing portion 120, the folding member 200 is not easily separated from the filter frame 100 and the engagement can be maintained by the stepped surface 232*a*. In other words, when the folding member 200 is mounted on the filter frame 100, there is an effect that the folding member 200 does not separate from the filter frame 100 even when the filter frame 100 rotates a plurality of times.

In addition, since the configuration of the folding member 200 becomes simplified, the weight can be decreased and the manufacturing cost can be reduced.

In addition, the folding member 200 can prevent air from entering through gaps between the plurality of filter frames 100 without passing through the air filter 31 when the plurality of filter frames 100 are in the unfolded state. Accordingly, air filtration efficiency can be improved.

Although the embodiments of the present disclosure have been described as specific embodiments, these are merely examples. The present disclosure is not limited to the above, and should be interpreted as having the broadest scope according to the technical idea disclosed in the present specification. Those skilled in the art may combine/substitute the disclosed embodiments to implement a pattern of a shape not disclosed herein, but this also does not depart from the scope of the present disclosure. In addition, those skilled in the art may easily change or modify the disclosed embodiments based on the present specification, and it is clear that such changes or modifications also fall within the scope of the present disclosure.

What is claimed is:

1. A filter holder comprising:

a plurality of filter frames, at least some of which are disposed adjacent to each other; and a folding member rotatably supporting the adjacent filter frames among the plurality of filter frames, wherein the folding member includes:

a folding portion having a predetermined thickness and having flexibility to allow the folding portion to be folded by rotation of the adjacent filter frames with respect to each other; and a plurality of edge portions connected to each side of the folding portion, with the folding portion being placed between one of the plurality of edge portions and an adjacent edge portion to the one and rotating together with the adjacent filter frames, and wherein the edge portions have a thickness greater than that of the folding portion when viewed in a cross-section of the folding member, wherein the plurality of filter frames are arranged along a loop-shaped path when the plurality of filter frames are rotated relative to each other such that each of the plurality of filter frames forms an angle smaller than a flat angle with respect to the filter frame adjacent thereto, wherein the folding member further includes a plurality of hooking portions engaged with the respective adjacent filter frames and connected to the respective edge portions, wherein each of the plurality of filter frames is provided with an engaging portion depressed from an inner side of the loop-shaped path toward an outer side thereof to engage with the hooking portion.

2. The filter holder of claim 1, wherein each of the plurality of edge portions has a shape in which the thickness of the edge portion becomes thicker as a distance from the folding portion increases.

3. The filter holder of claim 1, wherein the folding member extends along a longitudinal direction of the filter frames to seal a gap between the adjacent filter frames, and extends in a width direction of the filter frame to engage with the filter frames.

4. The filter holder of claim 1, wherein each of the plurality of filter frames is further provided with a plurality of fixing portions extending in a direction different from a direction in which the engaging portion extends and having one side communicating with the engaging portion, and wherein each of the hooking portions includes:

a main hook engaged with the engaging portion; and an auxiliary hook protruding from the main hook and engaged with the fixing portion.

5. The filter holder of claim 4, wherein the main hook is inserted in a width direction of the filter frame and engaged with the engaging portion, and wherein the auxiliary hook includes:

a stepped surface extending in a direction perpendicular to a direction in which the main hook extends; and an inclined surface inclined toward a direction in which the main hook is inserted into the engaging portion.

6. The filter holder of claim 4, wherein the folding member extends along a longitudinal direction of the filter frames, wherein the fixing portion and the auxiliary hook are each provided in plurality, wherein the plurality of fixing portions are spaced apart from each other along the longitudinal direction in the filter frames, and wherein the plurality of auxiliary hooks are spaced apart from each other along the longitudinal direction corresponding to each of the plurality of fixing portions in the hooking portions.

7. A filter assembly comprising:

the filter holder according to claim 1; and an air filter, for filtering air, supported by the filter holder.

8. An air purifier comprising:

the filter assembly according to claim 7; and a blower for providing blowing force to cause outside air to flow through the air filter.

9. A filter assembly comprising:

the filter holder according to claim 2; and an air filter, for filtering air, supported by the filter holder.

10. A filter assembly comprising:

the filter holder according to claim 3; and an air filter, for filtering air, supported by the filter holder.

11. A filter assembly comprising:

the filter holder according to claim 4; and an air filter, for filtering air, supported by the filter holder.

12. A filter assembly comprising:

the filter holder according to claim 6; and an air filter, for filtering air, supported by the filter holder.

13. A filter assembly comprising:

the filter holder according to claim 6; and an air filter, for filtering air, supported by the filter holder.

* * * * *